(No Model.)
J. H. SHEA.
GLASS VALVE SEAT.
No. 419,720. Patented Jan. 21, 1890.
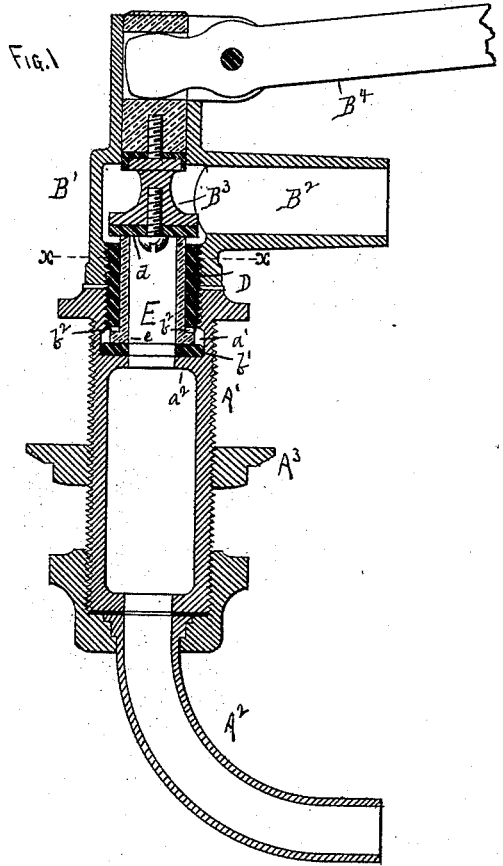
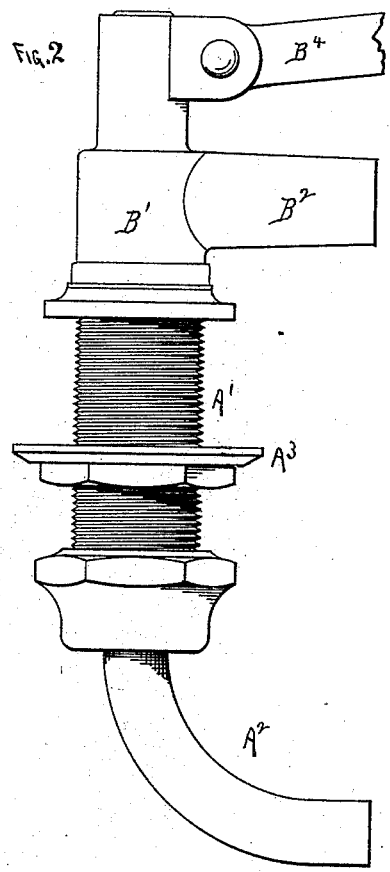
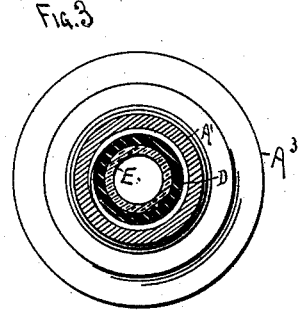
WITNESSES.
H. S. Webster.
Fred. G. L. Hunt.
John H. Shea,
INVENTOR, BY
Charles N. Woodward,
Atty.

UNITED STATES PATENT OFFICE.

JOHN H. SHEA, OF ST. PAUL, MINNESOTA.

GLASS VALVE-SEAT.

SPECIFICATION forming part of Letters Patent No. 419,720, dated January 21, 1890.

Application filed November 30, 1888. Serial No. 292,231. (No model.)

*To all whom it may concern:*

Be it known that I, JOHN H. SHEA, a citizen of the United States, residing at St. Paul, in the county of Ramsey and State of Minnesota, have invented certain new and useful Improvements in Glass Valve-Seats, of which the following is a specification.

This invention relates to the seats of valves through which water or other liquids containing gritty substances flow; and it consists in the manner of supporting the valve-seat in the stock of the cock, as hereinafter shown and described, and specifically pointed out in the claim.

In the drawings, Figure 1 is a sectional side elevation. Fig. 2 is a side elevation of a cock with my improved valve-seat arranged therein. Fig. 3 is a plan view, in section, on the line $x\ x$ of Fig. 1. Fig. 4 is a perspective view of the glass valve-seat detached from the stock.

$A'$ represents the main body or stock of the cock to which the inlet $A^2$ is connected, as shown, and provided with the nut $A^3$, by which the cock may be secured in the basin or tank in the ordinary manner.

$B'$ represents the "head" of the cock having the outlet $B^2$ and valve $B^3$, the latter adapted to be operated by a lever $B^4$, as shown. The head $B'$ is connected to the stock $A'$ by a bushing $D$, the screw-cavity $a'$ for the latter extending down into the stock below the bushing and ending in a shoulder $a^2$, adapted to support a rubber ring $b'$, as shown. The bushing $D$ is bored out true to adapt it to receive a tubular glass valve-seat $E$, the lower end of the seat being enlarged at $e$ and resting upon the rubber ring $b'$, the enlargement $e$ projecting outward beneath the bushing $D$ and thereby held in place. Between the bushing $D$ and the enlargement $e$ a rubber ring $b^2$ will be placed to prevent the metal of the bushing coming in contact with the glass. The upper edge of the tubular seat projects above the bushing, so that the rubber or leather face $d$ of the valve $B^3$ will not come in contact with the metal of the bushing. By this simple construction the valve-seat is securely held in position, and by its peculiar form all the strains of supporting it in position are exerted upon the enlargement $e$, and the latter being supported between the soft substances composing the rings $b'\ b^2$ is rendered less liable to breakage. All the strains of the valve $B^3$ are exerted lengthwise of the tubular seat, which renders it less liable to breakage from that source. Another important advantage of this construction is the ease with which the valve-seat may be removed when broken, as it is only necessary to unscrew the head $B'$ and bushing $D$ and without the necessity for removing or disturbing the stock or its attachments.

The "seat" can be very cheaply and easily constructed, and as these seats and the leather packing $d$ of the valve $B^3$ are the only parts which wear out, the "life" of the cock is very greatly lengthened.

This seat may be used to advantage in nearly all forms of cocks; but it is more particularly adapted for use in connection with water-closet-tank cocks, in one of which it is shown in the drawings.

Great annoyance is met with in using ordinary metal valve-seats in locations where water containing gritty substances flows through them by the frequency of the seats being cut out by the grit, and many efforts have been made to use glass or other hard substances for the seats, but have generally failed by the inability to so form and support them as to avoid undue strains, which have a tendency to break them; but by my simple arrangement the form of the seat enables me to support it without subjecting it to undue strains, or placing it in a position to be fractured.

Having thus described my invention, what I claim as new is—

In a valve, the combination of stock or body $A'$, having screw-cavity $a'$ and shoulder $a^2$, adapted to support rubber ring $b$, head $B'$, having valve $B^3$, screw-bushing $D$, connecting said head and stock, and a tubular valve-seat $E$, of glass or other similar substance, fitting the interior of said bushing and having collar or enlargement $e$, whereby it is supported by said bushing in said stock, substantially as and for the purpose set forth.

In testimony whereof I have hereunto set my hand in the presence of two subscribing witnesses.

JOHN H. SHEA.

Witnesses:
C. N. WOODWARD,
H. S. WEBSTER.